United States Patent [19]
Schultes

[11] Patent Number: 5,882,772
[45] Date of Patent: Mar. 16, 1999

[54] PACKING ELEMENT FOR USE, IN PARTICULAR, IN MASS TRANSFER AND/OR HEAT TRANSFER COLUMNS OR TOWERS

[75] Inventor: Michael Schultes, Ludwigshafen am Rhein, Germany

[73] Assignee: Raschig AG, Ludwigshafen am Rhein, Germany

[21] Appl. No.: 702,273

[22] Filed: Aug. 23, 1996

[30] Foreign Application Priority Data

Aug. 24, 1995 [DE] Germany ............ 195 31 151.5
Oct. 10, 1995 [DE] Germany ............ 295 16 027 U

[51] Int. Cl.⁶ .................. B32B 3/28; B01D 47/00
[52] U.S. Cl. .............. 428/174; 428/182; 428/184; 428/212; 261/112.2; 261/DIG. 72
[58] Field of Search ............... 428/182, 184, 428/114, 192, 212; 261/112.2, DIG. 72

[56] References Cited

U.S. PATENT DOCUMENTS

| | | | |
|---|---|---|---|
| 3,982,981 | 9/1976 | Takae et al. ............ | 428/184 |
| 4,344,899 | 8/1982 | Monjoie ............ | 428/184 |
| 4,800,047 | 1/1989 | Monjoie ............ | 428/184 |
| 4,915,878 | 4/1990 | György et al. ............ | 428/184 |
| 4,917,935 | 4/1990 | Kubicek ............ | 428/184 |
| 5,667,875 | 9/1997 | Usui ............ | 428/182 |

*Primary Examiner*—Donald Loney
*Attorney, Agent, or Firm*—Dvorak & Orum

[57] ABSTRACT

A novel pourable packing element is provided herein for use, in particular, in mass transfer and/or heat transfer towers through which a gas or a liquid flows. The exchange areas of such packing element are formed by the surfaces of half-wave-shaped or wave-shaped strips. The packing element possesses at least a first group of strips having a first periodic length and at least one adjoining second group of strips having at least one strip with a second periodic length. The first periodic length of a selected first strip in the first group of strips, (such selected first strip adjoining the second group of strips), and the second periodic length of a selected second strip in the second group (such selected second strip adjoining the first group of strips), is matched to each other in such a way that two adjoining strips of the first group of strips and the second group of strips are in contact with one another at at least one point, so that liquid can pass from one strip to the other strip.

30 Claims, 3 Drawing Sheets

PACKING ELEMENT FOR USE, IN PARTICULAR, IN MASS TRANSFER AND/OR HEAT TRANSFER COLUMNS OR TOWERS

BACKGROUND OF THE INVENTION

1. Field of the Invention

The invention relates to a packing element possessing a plurality of exchange surfaces, for use, in particular, in mass transfer and/or heat transfer towers through which a gas or a liquid flows.

2. Description of the Prior Art

Such packing elements are known and are used as column packings in fractionation procedures in order to create the largest possible contact area between the flow of liquid and a counter-current flow of gas passing through the column. For this purpose, it is necessary that the packing elements which are loaded into the mass transfer and/or heat transfer column should possess the largest possible exchange surfaces for these two flows passing through the column, so that both flows are dispersed and distributed uniformly over the cross-section of the column by the exchange surfaces, while assuring the most intensive possible intimate contact with one another. However, large exchange surfaces per volume unit of the packing element usually result in a high flow resistance in the column, and, as a result, there is a disadvantageous drop in pressure in the gas flow.

Furthermore, the packing elements that make up the packing of the columns are randomly arranged and the individual elements do not have a defined orientation. As a result, the packing elements do not possess exactly defined points of impingement for the droplets of liquid impinging thereon from the liquid flowing through the column. This means, however, that, in a large number of applications, the entire available exchange surface of a packing element is not used. Alternatively, special baffles must be used to distribute the liquid over the exchange surfaces of the packing element. However, with the known type of packing elements, the baffles which are needed to achieve uniform distribution of the liquid droplets over the packing element also induce a disadvantageous increase in the pressure loss in the column.

SUMMARY OF THE INVENTION

Aims of the Invention

It is therefore a principal object of the present invention to provide an improvement in such a pourable packing element which not only has a large specific surface area, but also induces only a low pressure loss in the column.

Statement of the Invention

By this invention, a packing element is provided in which the packing element possesses a plurality of exchange surfaces. In such packing element, the exchange surfaces are formed by the surfaces of half-wave-shaped or wave-shaped strips. The packing element possesses at least a first group of strips having at least one half-wave-shaped or wave-shaped strip having a first periodic length, and at least one adjacent second group of strips having at least one half-wave-shaped or wave shaped strip having a second periodic length. The first periodic length and/or the shape of a selected first strip in the first group of strips, in which that selected first strip in the first group of strips adjoins the second group of strips, and the periodic length and/or the shape of a selected second strip in the second group of strips, in which that selected second strip in the second group of strips adjoins the first group of strips, are matched to each other in such a way that two adjoining strips in the first group of strips and in the second group of strips, are in contact with each other at at least one point, thus permitting the passage of liquid from one of the two adjoining strips to another of such strips.

Other Features of the Invention

By a feature of this invention, the packing element possesses at least a third group of strips containing at least one half-wave-shaped strip or wave-shaped strip having a third periodic length, and the third periodic length and/or the shape of a selected third strip in the third group of strips, in which that selected third strip adjoins the second group of strips, and the second periodic length and/or the shape of the selected second strip in the second group of strips, in which that selected second strip adjoins the third group of strips, are matched to each other in such a way that the two adjoining strips in the second group of strips and in the third group of strips are in contact at at least one point.

By another feature of this invention, all the half-wave shaped strips or wave-shaped strips in at least one group of the strips of the packing element, possess substantially the same periodic length, namely, the first periodic length is equal to the second periodic length.

By a subsidiary feature of this feature of this invention, all the half-wave shaped strips or wave-shaped strips in at least one group of strips of the packing element, possess substantially the same periodic length, namely, the first periodic length is equal to the second periodic length and is also equal to the third periodic length.

By another subsidiary feature of this feature of this invention, the first periodic length of at least one half-wave shaped strip or wave-shaped strip in the first group of strips is smaller than, or is equal to, the third periodic length of a half-wave shaped strip or wave-shaped strip in the third group of strips.

By yet another feature of this invention, the second periodic length of the second group of strips is smaller than, or is equal to, the first periodic length of the first group of strips.

By a subsidiary feature of this feature of this invention, the second periodic length of the second group of strips is smaller than, or is equal to, the third periodic length of the third group of strips.

By another subsidiary feature of this feature of this invention, the first periodic length of the strips of the first group of strips is a multiple of the second periodic length of the strips of the second group of strips; preferably that multiple is an even-numbered multiple.

By still another feature of this invention, two adjacent strips of the packing element are mechanically joined at their point of contact.

By a subsidiary feature of this feature of this invention, at least two adjacent strips of the groups of strips of the packing element each possess a web element; preferably the web elements of the strips form a common web; and still more preferably the common web extends from a first outer side of the packing element to a second outer side of the packing element which is opposite to the first outer side of the packing element.

By yet a further feature of this invention, the packing element possesses at least one outer web interconnecting the strips of the groups of strips.

By a still further feature of this invention, at least two strips of at least one group of strips of the packing element are arranged in opposite phase to each other.

By a subsidiary feature of this feature of this invention, at least two adjacent strips of the second group of strips and two adjacent groups of the first group of strips are arranged in opposite phase.

By a still further variant of this invention, at least one half-wave of one strip is arranged in opposite phase to a half-wave of an adjacent strip.

By one subsidiary feature of this feature of this invention, an upper half-wave of a strip, or a lower half-wave of a strip is arranged in opposite phase to a lower half-wave or an upper half-wave, respectively, of an adjacent strip.

By yet a further feature of this invention, the packing element is made of metal, e.g., of sheet metal, or of ceramic or of a synthetic plastic material.

By a still further feature of this invention, the packing element is flatter than square in width.

Generalized Description of the Invention

As described above, in general, a pourable packing element as provided herein is created in a particularly advantageous manner. In such packing element, the liquid is, to a very large extent, uniformly distributed over the individual strips, i.e., over the exchange surfaces, of the packing element. On the one hand, the half-wave-shaped or wave-shaped structure of the strips of which the packing elements are composed ensures that the droplets of liquid can easily distribute themselves over these strips. On the other hand, by matching the periodic length of the individual strips to each other, in the manner according to this invention, adjacent strips advantageously intersect with each other at at least one point, thus permitting the passage of liquid from one strip to the other adjoining strip. Such half-wave-shaped or wave-shaped configuration of the individual strips in the packing element according to this invention offers the further advantage that it creates a packing element with a particularly open structure, which causes only a minor drop in pressure in the column.

In an advantageous embodiment of this invention, at least one of the groups of strips in the packing element possesses at least two strips. The strips in this group of strips are in contact with each other at at least one point. This embodiment has the advantage that the liquid impinging on such packing element can be particularly advantageously distributed over the strips belonging to this group of strips.

According to a further advantageous embodiment of this invention, substantially all the wave-shaped strips in a group of strips possess substantially the same periodic length. Preferably, in such embodiments, adjacent strips are arranged in opposite phase. This embodiment achieves a particularly open structure in the packing element so that such packing element has an especially low flow resistance.

In another advantageous embodiment of this invention, the periodic length of at least one of the strips in the second group of strips is smaller than the periodic length of the first group of strips. The advantage of such an embodiment is that more contact points are advantageously formed between the edge strips of the first and second group.

According to a further advantageous embodiment of this invention, the periodic length of the strips in the first group of strips is a multiple, preferably an even-numbered multiple, of the periodic length of the strips in the second group of strips. Through this embodiment, a continuous connection between the individual strips of the packing element, running right across the entire packing element, is advantageously formed in the central section of the packing element so that especially good distribution of the liquid over all the strips of the packing element is assured.

BRIEF DESCRIPTION OF THE DRAWINGS

In the accompanying drawings.

DESCRIPTION OF THE PREFERRED EMBODIMENTS

Figure 1:
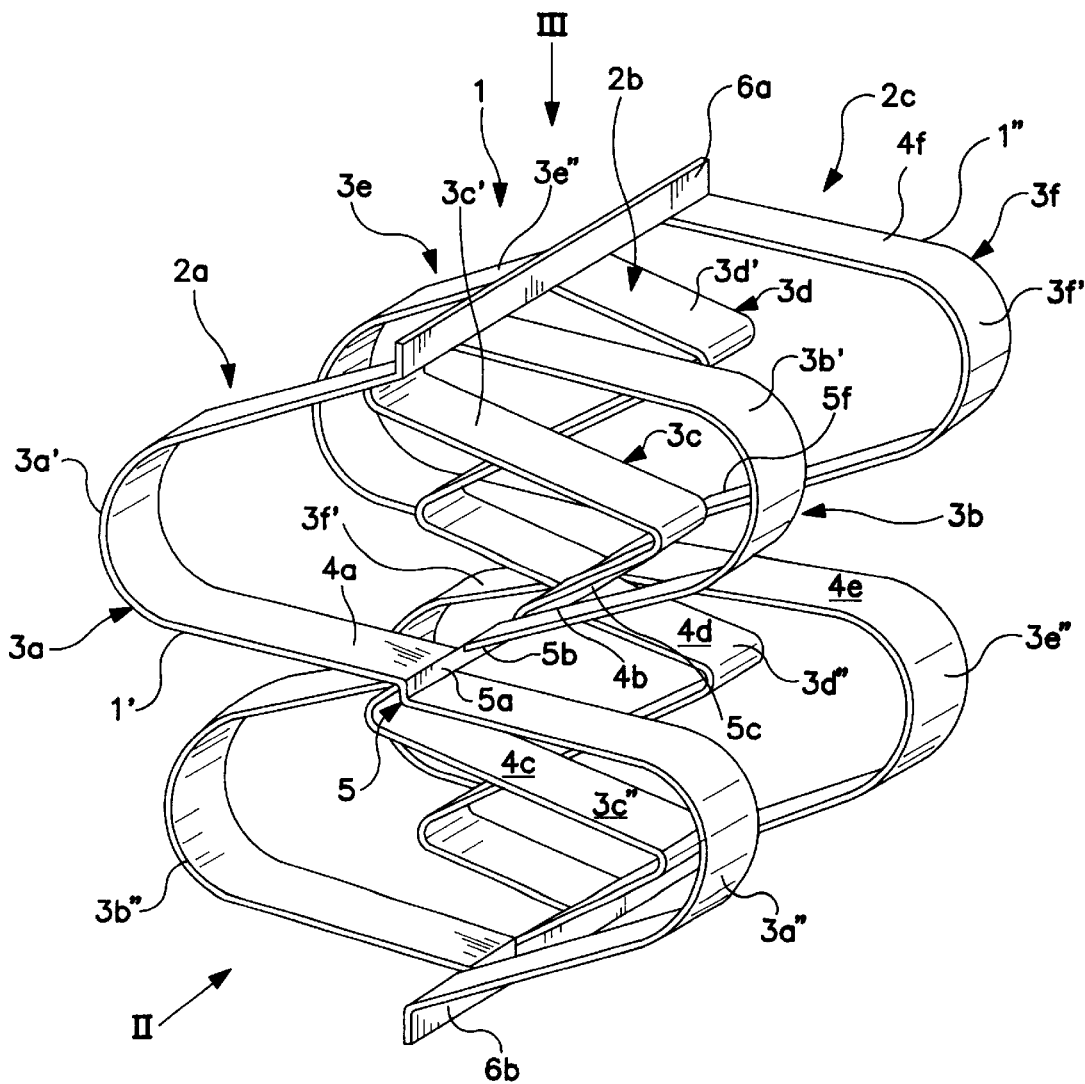
FIG. 1 is a perspective view of one embodiment of the packing element.
Figure 2:
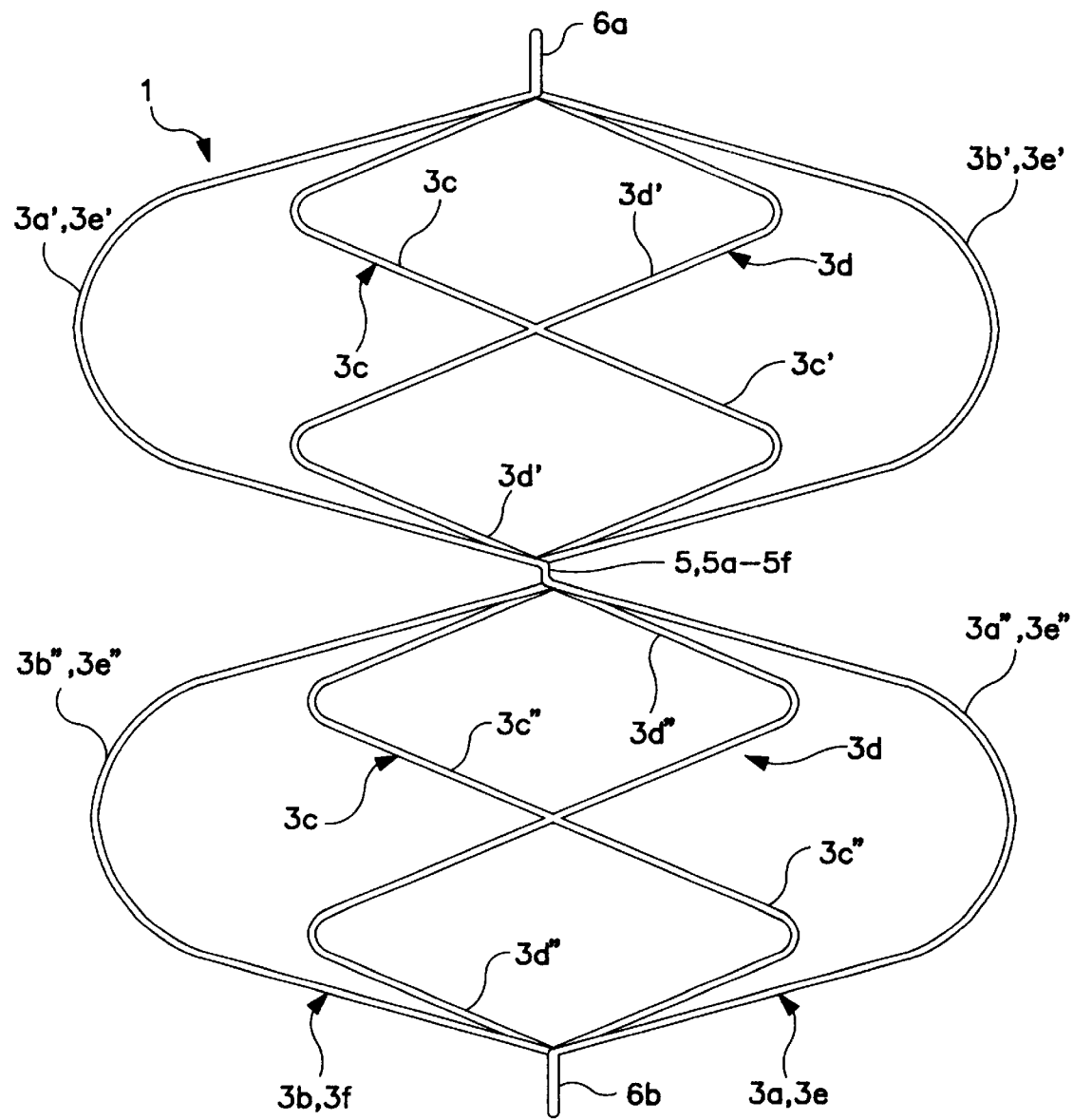
FIG. 2 is a view of the embodiment illustrated in FIG. 1, looking in the direction of arrow II.
Figure 3:
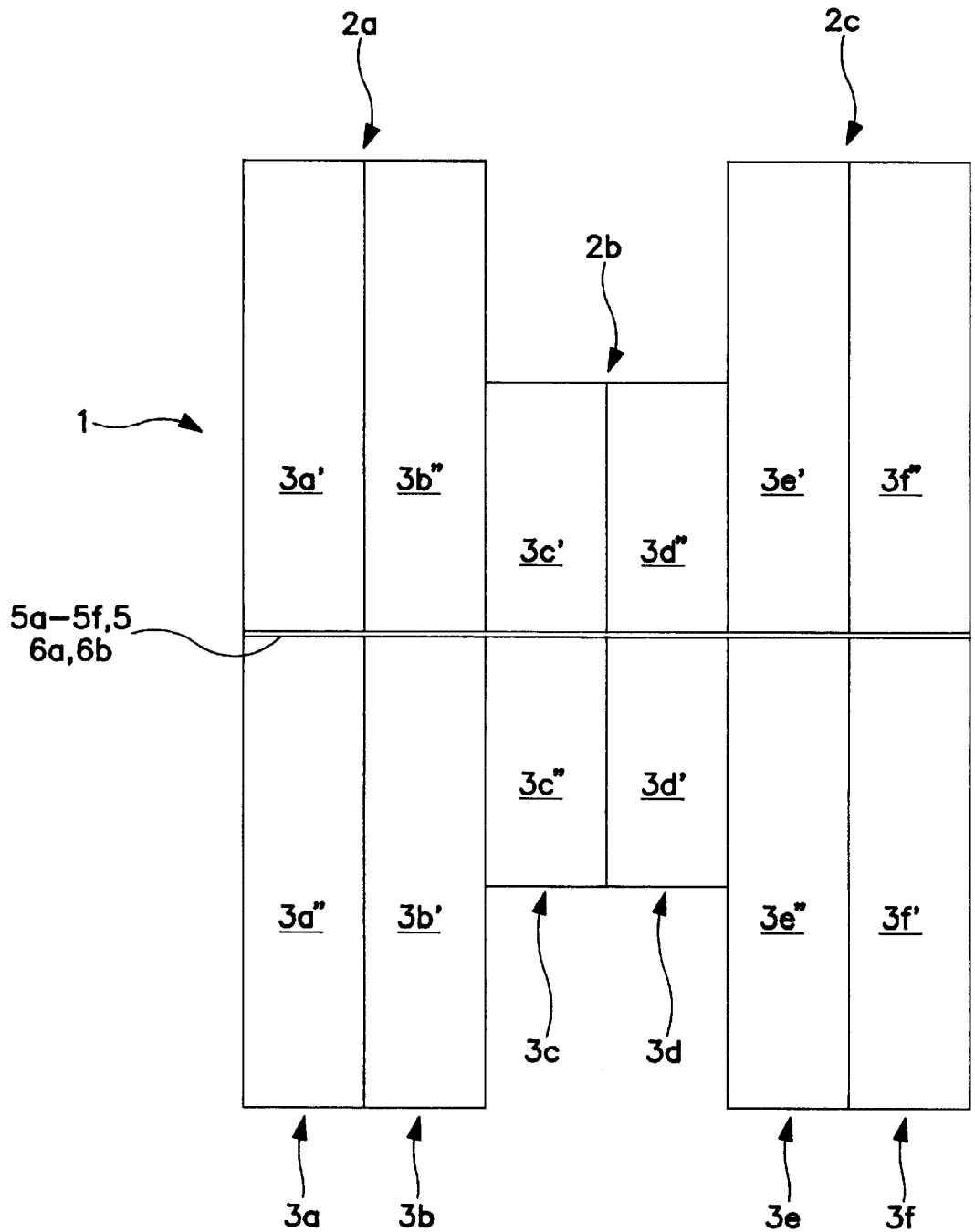
FIG. 3 is a view of the embodiment illustrated in FIG. 1, looking in the direction of arrow III.

Description of FIG. 1, FIG. 2 and FIG. 3

The embodiment of a packing element generally designated by the reference number 1, which is illustrated in FIGS. 1 to 3, possesses three groups 2a, 2b and 2c of wave-shaped strips 3a and 3b, 3c and 3d and 3e and 3f, whose surfaces form the exchange surfaces 4a–4f of the packing element 1. The strips 3a and 3b or 3a and 3d or 3e and 3f of the first or second or third groups 2a or 2b or 2c, respectively, possess a periodic length $l_1$ or $l_2$ or $l_3$, respectively.

In the embodiment shown here, the packing element 1 possesses three groups of strips 2a, 2b and 2c. This three-group configuration of the packing element 1 is not the only one possible. Instead, depending on the desired application, it is possible to provide fewer, or more, than three such groups of strips, each containing at least one strip 3a–3f, which may also be half-wave-shaped. In a minimum case, the packing element 1 consists of just two groups of strips, each of which contains only one strip.

In the embodiment illustrated here, the periodic length $l_1$ of the two strips 3a,3b of the first group of strips, 2a is equal to the periodic length 13 of the strips 3e, 3f of the third group of strips 2c, while the two wave-shaped strips 3c, 3d of the second group of strips 2b have a periodic length $l_2$, which, in the embodiment described here, is half as long as the periodic length $l_1$ of the strips 3a,3b, 3e, 3f of the first group of strips 2a and the third group of strips 2c. Generalizing this embodiment, it should be added that the second periodic length $l_2$ of the strips 3c, 3d adjoining the first group of strips 2a is preferably related according to the expression $l_2=l_1/n$, where n=1, 2 . . . , etc. to the second group of strips 2b having the periodic length $l_1$, i.e. the periodic length $l_1$, is a multiple, especially an even-numbered multiple, of the periodic length $l_2$ or is substantially equal to this periodic length $l_2$.

Through this preferred ratio between the periodic lengths $l_1$ and $l_2$, all the strips 3a–3f of the packing element 1 advantageously possess a minimum amplitude in the mid-section 1a of the packing element, so that, as can best be seen from FIG. 2, all the strips 3a–3f are in contact at this mid-section 1a. As a result, a continuous connection is formed from the left outer edge 1' to the right outer edge 1" of the packing element 1. That connection permits the liquid present on the packing element 1 to be distributed over the entire packing element.

In order to reinforce this effect, this mid-section 1a of the packing element 1 can be made broader by providing the strips 3a–3f in this area with a web element 5a–5f, so that the individual web elements 5a–5f of the strips 3a–3f form a continuous central web 5 on the packing element 1.

While the configuration of the packing element 1 described above, with the central web 5, is preferred, it is not absolutely essential. Instead, in order to achieve passage of the liquid, it is sufficient if adjacent pairs of webs 3a–3f are in contact with each other at at least one point in such a way that liquid can pass from one strip 3a–3f to another strip.

As regards the gas permeability of the packing element 1, it is advantageous if adjacent strips 3a and 3b, 3b and 3c, etc. are arranged in opposite phase to each other. This can best be seen in FIG. 1, which shows that, in the embodiment described, the upper half wave 3a' of the first wave-shaped strip 3a is alternatingly arranged in relation to the upper half wave 3b' of the second wave-shaped strip 3b. Correspondingly, the spatial orientation of the lower half wave 3a" of the first wave-shaped strip 3a is alternatingly arranged in relation to the lower half wave 3b" of the second strip 3b of the two strips 3a, 3b belonging to the first group of strips 2a. It is naturally also conceivable that this opposite-phase arrangement be provided only for the opposite half waves 3a', 3b' or 3a", 3b" of two adjacent strips 3a,3b, or that only one upper and one lower half wave 3a" and 3b" or one lower and one upper half wave 3a" and 3b' alternate spatially. The expert in the field can see that, depending on the respective application of the packing element 1, a plurality of arrangements of the two half waves 3a', 3a" and 3b', 3b" of the wave-shaped strips 3a, 3b is possible.

The relative spatial arrangement of the half waves 3c', 3c" and 3d', 3d" of the two wave-shaped strips 3c, 3d of the second group of strips 2b, as well as the relative spatial arrangement of the half waves 3e', 3e" and 3f, 3f" of the two strips 3e, 3f of the third group of strips 2c of the packing element 1, is preferably the same as that of the strips 3a, 3b of the first group of strips 2a. In this case, however, preference is given to selecting the orientation of the strips 3c or 3e adjoining the respective preceding group of strips 2a or 2b in such a way that they are alternatingly arranged, i.e. are arranged in opposite phase, to those of the corresponding strips 3b or 3d of the preceding group of strips 2a or 2b.

In order to ensure that the pourable packing element 1 possesses adequate mechanical stability, and to permit better passage of liquid from one adjacent strip to another, the individual strips 3a–3f are preferably mechanically connected at their contact points. It must, however, be stressed that this mechanical connection is not absolutely essential to permit liquid to pass from one adjacent strip 3a–3f to another, because it is also quite possible to arrange the spacing between two adjacent strips 3a–3f so that liquid transfer can be achieved by a capillary effect.

As can best be seen from FIG. 2, the individual strips 3a–3f are substantially-sinusoidal in shape. The advantage of this shape is that droplets of liquid located on the strips 3a–3f can move along these strips without immediately dripping off. It is, however, also possible that, instead of having a sinusoidal shape, the wave-shaped strips 3a–3f may also have other wave shapes, e.g., triangular, sawtooth or stepped shape of the half waves 3a'–3f', and 3a"–3f".

The described packing element 1 also possesses the advantage that it is easy to manufacture from sheet metal by making cuts in the sheet metal in a first manufacturing step, thereby separating the individual strips 3a–3f from each other. The individual strips 3a–3f of the packing element 1 are now held together by outer webs 6a, 6b. In a second manufacturing step, the now separated metal strips in the sheet metal are deformed in a simple operation to produce the wave-shaped structure of the strips 3a–3f. The strips 3a–3f may be mechanically joined at their contact points.

In order to increase still further the mechanical stability of the packing element 1 described herein, it is possible to provide at least one stiffening groove (not shown here) in at least one of the strips 3a–3f.

It is also, however, possible to produce the packing element 1 from ceramic or synthetic plastic material instead of from metal. In the case of synthetic plastic material, the packing element can advantageously be manufactured by injection moulding.

It should also be mentioned that the packing element is preferably flatter than square in width, because, when it is poured, the packing element 1 then preferentially comes to rest on its flat side, i.e., the side with the large openings between the waveshaped strips 3a–3f. As a result, the drop in pressure in the gas flowing through packing element 1 in the column loaded with such packing elements is kept to a minimum.

It should also be mentioned that, among the many possible configurations of the packing element 1, preference is given to the one shown in the Figures. In other words, it is preferred that a central group of strips having a smaller periodic length $l_2$ be laterally bordered in each case by a group of strips 2a, 2c having a larger periodic length $l_1$, $l_3$, because this configuration results in a particularly low resistance to the gas flowing through the column. Generalizing, this design principle consists of two peripheral groups of strips 2a, 2c having a periodic length $l_1$, $l_3$ between which one or more further groups of strips 2b having a shorter periodic length are arranged.

It is also possible, however, that, instead of changing the periodic length $l_1$, $l_2$, $l_3$ of the strips 3a–3f, their shape or their amplitude may be changed, especially when the periodic length of two adjoining strips 3a–3c, for example of the strips 2a and 2b, is substantially the same. The transfer of liquid from one adjacent strip to another is then chiefly achieved by suitably choosing the shape or the amplitude of the half-wave-shaped or wave-shaped strips 3a–3f.

Conclusion

It can therefore be stated that, in the described packing element 1, the periodic length of the half-wave shaped or the wave-shape of the strips 3a–3f and/or their shape and amplitude are matched to each other in such a way that optimum distribution is achieved of the gas and/or liquid flow within the column or tower.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A packing element for random packing for use in mass transfer and heat transfer columns through which at least one fluid flows, said packing element having a length-wise and width-wise direction, a plurality of one of at least one of a half-waved shaped strips and wave-shaped strips each having a respective length extending generally along the width-wise direction of the packing element, each of said strips having top and bottom surfaces and interconnecting, opposed side surfaces, the top and bottom surfaces of each strip defining exchange surfaces for the at lease one fluid, the strips of the packing element being arranged side-by-side in the length-wise direction of the packing element, said strips of the packing element being divided into at least two groups, said first and second groups respectively comprised of at least one strip, all of the strips of the first group having a first shape and a first periodic length and all of the strips of the second group having a second shape and a second periodic length, said first and second groups each having a respective selected strip, which said selected strips are arranged side-by-side, adjacent to each other, wherein the first shape and first periodic lengths of the strips of the first group and the second shape and second periodic lengths of the strips of the second group are matched to each other in a manner such that the side surfaces of the selected adjacent strips are at least one physically and capillarilly contacting each other at at least one point but not collectively at a number of points so as to continuously join said adjacent strips along their respective lengths, wherein fluid may travel from the selected strip of said one group to the adjacent selected strip of a next group by one of direct flow and capillary action to enhance the distribution of the fluid over the strips of the packing element.

2. The packing element according to claim 1 further comprising at least a third group of at least one of a half-wave-shaped strip and wave-shaped strip, each of said strips of said third group having top and bottom surfaces and interconnecting, opposed side surfaces, the top and bottom surfaces of each strip defining exchange surfaces for the at least one fluid, the strips of the third group arranged side-by-side in the lengthwise direction of the packing element, all of the strips of the third group having at least one of a third periodic length and a third shape, said second and third groups having a respective selected strip, wherein said selected strips are arranged side-by-side, adjacent to each other, wherein at least one of said third periodic length and said third shape of the strips of the third group and at least one of said second periodic length and said second shape of the strips of the second group are matched to each other in a manner such that the side surfaces of the selected adjacent strips of the second and third group are at least one of physically and capillary contacting each other at at least one point but not collectively at a number of points so as to continuously join said adjacent strips along the respective lengths, wherein fluid may travel from the selected strip of said one group to the adjacent selective strip of the neighboring group by one of direct flow and capillary action to enhance the distribution of fluid over the strips of the packing element.

3. The packing element according to claim 1 wherein in at least one group of strips of the packing element, all strips have the same periodic length.

4. The packing element according to claim 2, wherein at least one strip of said first and third group of strips of the packing element have the same periodic length, and the same shape.

5. The packing element according to claim 1, wherein said second periodic length is one of smaller than and equal to at least one of said first and said third periodic length.

6. The packing element according to claim 1, wherein the first periodic length of said strips of said first group is a multiple of the second periodic length of the strips of the second group.

7. The packing element according to claim 6, wherein said multiple is an even-numbered multiple.

8. The packing element according to claim 1, wherein two adjacent strips of said packing element are mechanically joined at at least one of their points of contact.

9. The packing element according to claim 1, further comprising web elements connected to at least two adjacent strips of at least one group of strips of said packing element.

10. The packing element according to claim 9, wherein said web elements of said strips form a common web element.

11. The packing element according to claim 10, wherein said common web element extends over the length-wise direction of said packing element.

12. The packing element according to claim 1, wherein at least two strips of at least one group of strips of said packing element are arranged in opposite phase to each other.

13. The packing element according to claim 1, wherein at least two selected strips of two adjacent groups of strips are arranged in opposite phase to each other.

14. The packing element according to claim 1, wherein said packing element has at least one web element connecting said strips of at least one group of strips at at least one of their respective ends.

15. The packing element according to claim 14, wherein at least one half-wave of a strip is arranged in opposite phase to a half-wave of an adjacent strip.

16. The packing element according to claim 15, wherein each strip has an upper and lower half and one of an upper half-wave and a lower half-wave of a strip is arranged in opposite phase to one of a lower half-wave and an upper half-wave, respectively, of the adjacent strip.

17. The packing element according to claim 1 wherein said packing element is made of metal.

18. The packing element according to claim 17 wherein said packing element is made of sheet metal.

19. The packing element according to claim 1 wherein said packing element is made of ceramic.

20. The packing element according to claim 1 wherein said packing element is made of synthetic plastic material.

21. The packing element according to claim 1 wherein said packing element is flatter than square in width.

22. A packing element for random packing for use in mass transfer and heat transfer columns through which at least one fluid flows, said packing element having a length-wise and width-wise direction, a plurality of one of at least one of a half-waved shaped strips and wave-shaped strips each having a respective length extending generally along the width-wise direction of the packing element, each of said strips having top and bottom surfaces and interconnecting, opposed side surfaces, the top and bottom surfaces of each strip defining exchange surfaces for the at least one fluid, the strips of the packing element being arranged side-by-side in the length-wise direction of the packing element, said first strips of the packing element being divided into at least two groups, said first and second groups respectively comprised of at least one strip, all of the strips of the first group having a first shape and all of the strips of the second group having a second shape, said first and second groups each having a respective selected strip, which said selected strips are arranged side-by-side, adjacent to each other, wherein the first shape of the strips of the first group and the second shape of the strips of the second group are matched to each other in a manner such that the side surfaces of the selected adjacent strips are at least one of physically and capillarilly contacting each other at at least one point but not collectively at a number of points so as to continuously join and adjacent strips along their respective length, wherein fluid may travel from the selected strip of said one group to the adjacent selected strip of a next group by one of direct flow and capillary action to enhance the distribution of the fluid over the strips of the packing element.

23. The packing element according to claim 22, further comprising at least a third group of at least one of a half-wave-shaped strip and wave-shaped strip, each of said strips of said third group having top and bottom surfaces and interconnecting, opposed side surfaces, the top and bottom surfaces of each strip defining exchange surfaces for the at least one fluid, the strips of the third group arranged side-by-side in the lengthwise direction of the packing element, all of the strips of the third group having a third shape, said second and third groups having a respective selected strip, wherein said selected strips are arranged side-by-side, adjacent to each other, wherein said third shape of the strips of the third group and said second said second shape of the strips of the second group are matched to each other in a manner such that the side surfaces of the selected adjacent strips of the second and third group are at least one of physically and capillary contacting each other at at least one point but not collectively at a number of points so as to continuously join said adjacent strips along the respective lengths, wherein fluid may travel from the selected strip of said one group to the adjacent selective strip of the neighboring group by one of direct flow and capillary action to enhance the distribution of fluid over the strips of the packing element.

24. A packing element for random packing for use in mass transfer and heat transfer columns through which at least one fluid flows, said packing element having a length-wise and a width-wise direction, a plurality of one of at least one of a half-waved shaped strips and wave-shaped strips each having a respective length extending generally along the width-wise direction of said packing element, each of said strips having top and bottom surfaces and interconnecting, opposed side surfaces, the top and bottom surfaces of each strip defining exchange surfaces for the at least one fluid, the strips of the packing element being arranged side-by-side in the length-wise direction of the packing element, said strips of the packing element being divided into at least two groups, said first and second groups respectively comprised of at least one strip, all of the strips of the first group having a first periodic length and all of the strips of the second group having a second periodic length, said first and second groups each having a respective selected strip, which said selected strips are arranged side-by-side, adjacent to each other, wherein the first periodic lengths of the strips of the first group and the second periodic lengths of the strips of the second group are matched to each other in a manner such that the side surfaces of the selected adjacent strips are at least one of physically and capillarilly contacting each other at at least one point but not collectively at a number of points so as to continuously join said adjacent strips along their respective lengths, wherein fluid may travel from the selected strip of said one group to the adjacent selected strip of a next group by one of direct flow and capillary action to enhance the distribution of the fluid over the strips of the packing element.

25. The packing element according to claim 24, further comprising at least a third group of at least one of a half-wave-shaped strip and wave-shaped strip, each of said strips of said third group having top and bottom surfaces and interconnecting, opposed side surfaces, the top and bottom surfaces of each strip defining exchange surfaces for the at least one fluid, the strips of the third group arranged side-by-side in the lengthwise direction of the packing element, all of the strips of the third group having a third periodic length, said second and third groups having a respective selected strip, wherein said selected strips are arranged side-by-side, adjacent to each other, wherein at least one of said third periodic lengths of the strips of the third group and at least one of said second periodic lengths of the strips of the second group are matched to each other in a manner such that the side surfaces of the selected adjacent strips of the second and third group are at least one of physically and capillary contacting each other at at least one point but not collectively at a number of points so as to continuously join said adjacent strips along; the respective lengths, wherein fluid may travel from the selected strip of said one group to the adjacent selective strip of the neighboring group by one of direct flow and capillary action to enhance the distribution of fluid over the strips of the packing element.

26. The packing element according to claim 22 wherein said first shape and said second shape are respectively one of the shapes selected from the group consisting of a sinusoidal shape, a triangular shape, a sawtooth shape, and a stepped shape.

27. The packing element according to claim 22 wherein said first shape is the same as said second shape.

28. The packing element according to claim 23 wherein said third shape is one of the shapes selected from the group consisting of a sinusoidal shape, a triangular shape, a sawtooth shape and a stepped shape.

29. The packing element of claim 2 wherein said first, second, and third groups of strips form a discrete free standing unit.

30. The packing element of claim 29 wherein the discrete free standing unit is packed into a mass transfer or heat transfer column in a random fashion.

* * * * *